Feb. 19, 1952 F. HOTCHNER 2,586,231
ILLUMINATED DISPLAY DEVICE WITH ANIMATION
Filed April 17, 1947 3 Sheets-Sheet 1
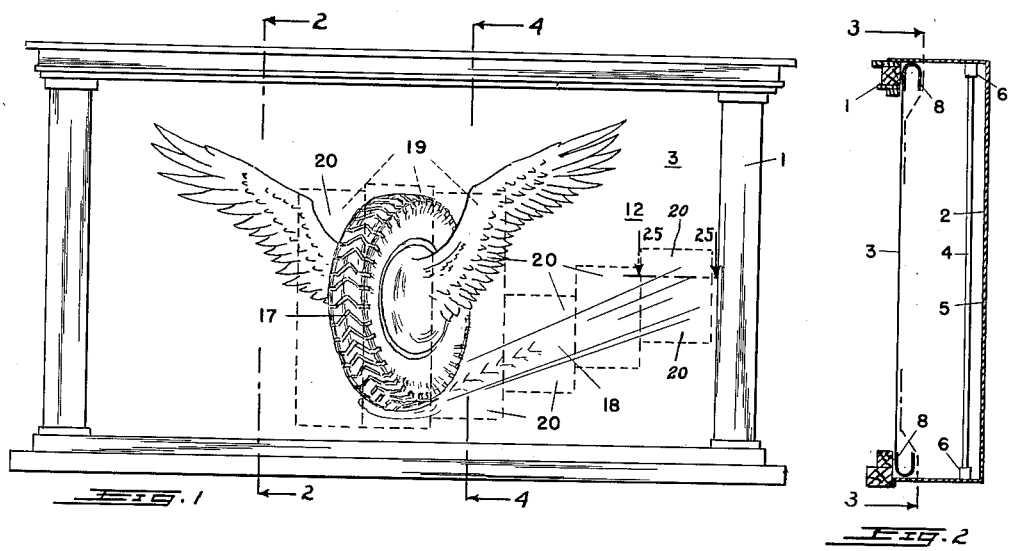
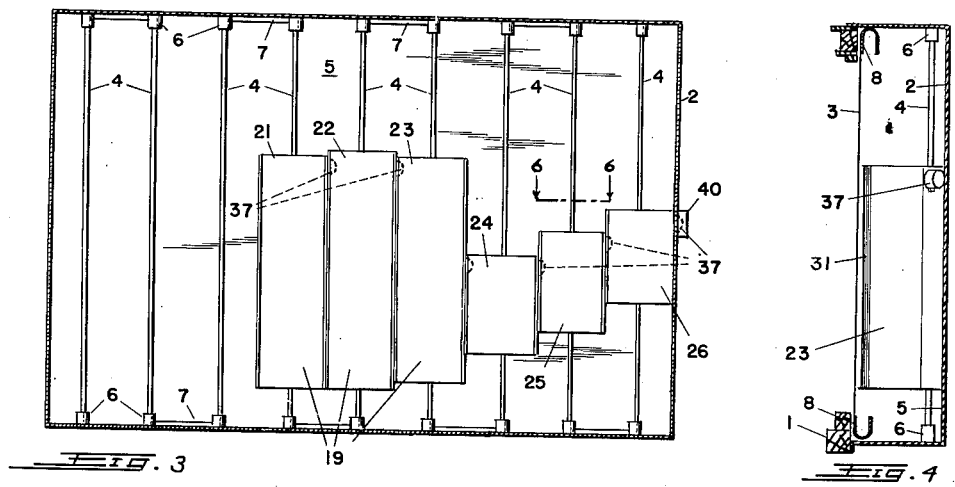
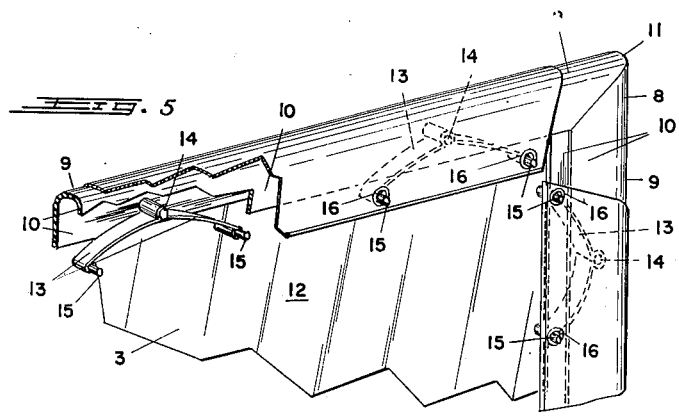
INVENTOR.
Fred Hotchner Feb. 19, 1952       F. HOTCHNER       2,586,231
ILLUMINATED DISPLAY DEVICE WITH ANIMATION
Filed April 17, 1947                  3 Sheets-Sheet 2
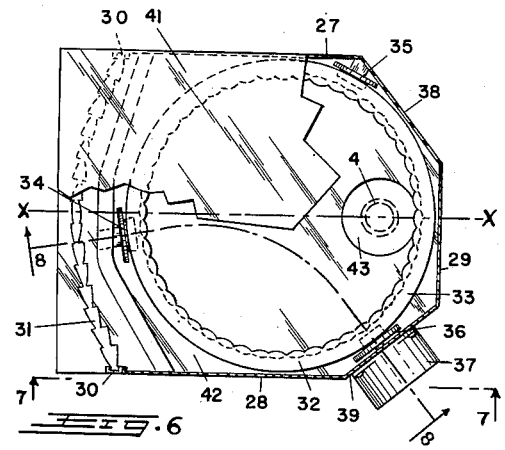
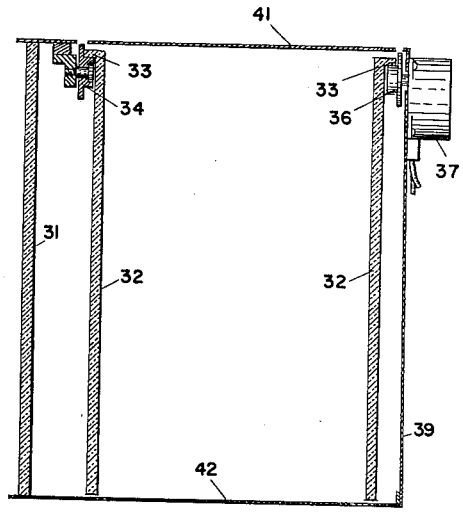
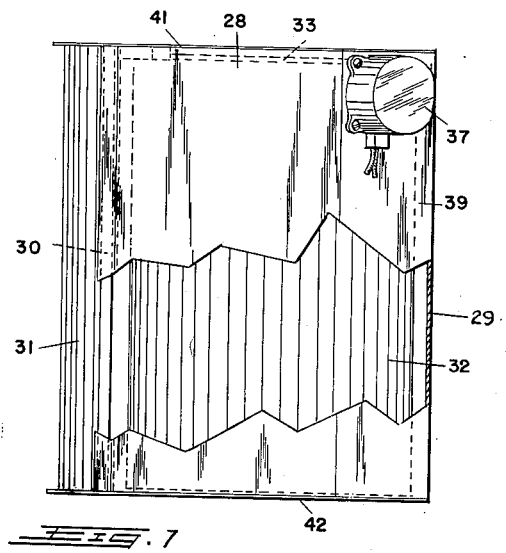
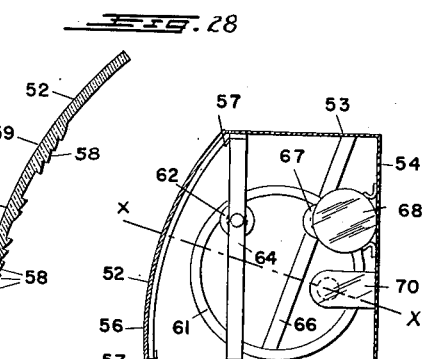
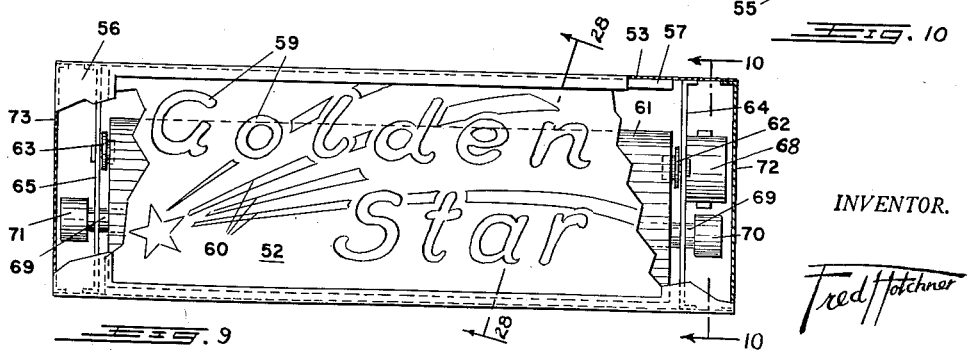
INVENTOR.
Fred Hotchner

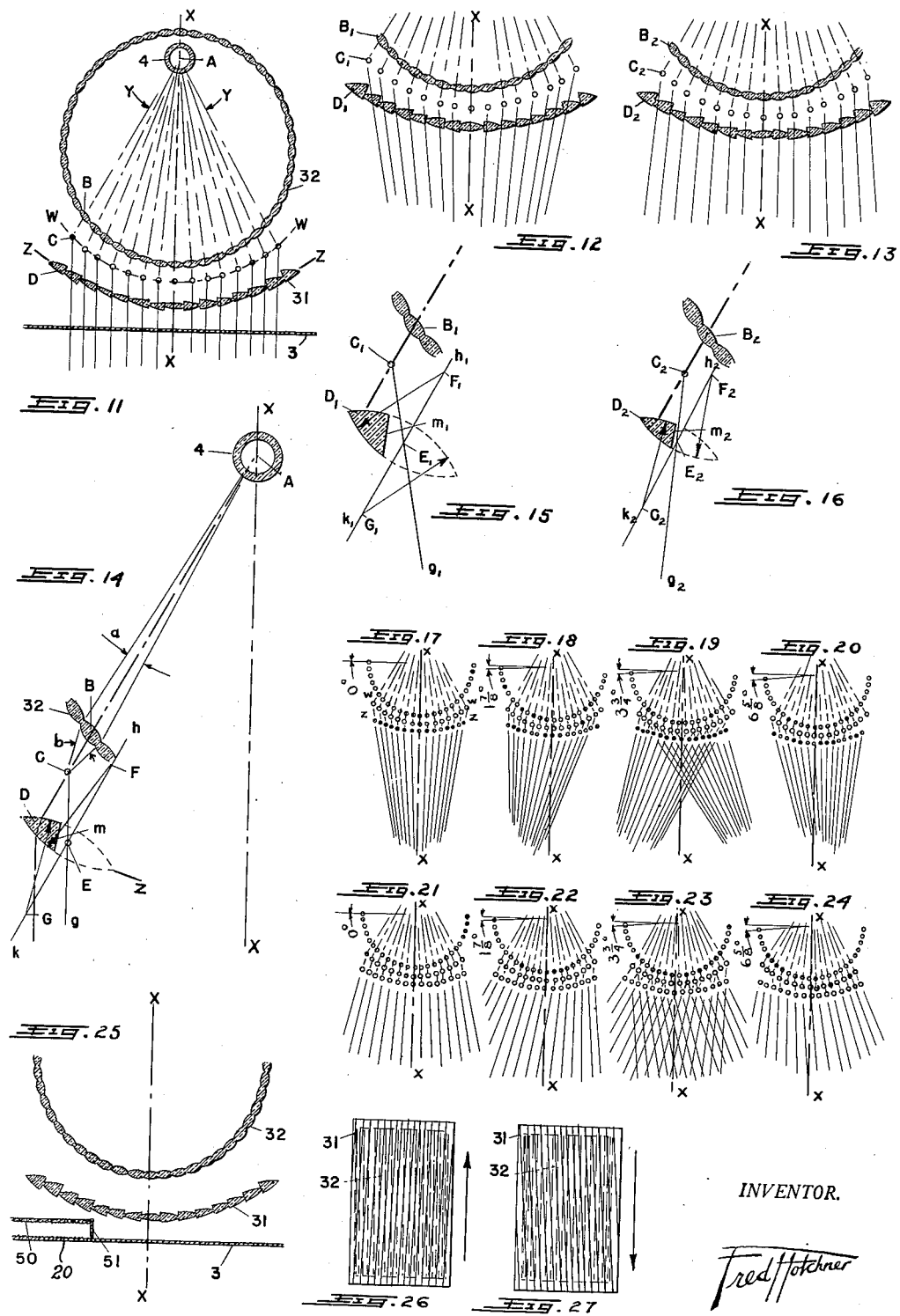

Patented Feb. 19, 1952

2,586,231

UNITED STATES PATENT OFFICE 2,586,231

ILLUMINATED DISPLAY DEVICE WITH ANIMATION

Fred Hotchner, Los Angeles, Calif.

Application April 17, 1947, Serial No. 742,132

12 Claims. (Cl. 40—130)

This invention relates to an illuminated display device with amination and provides certain improvements over the invention disclosed in my copending application, Serial No. 429,299, filed February 2, 1942, now Patent No. 2,419,216, whereby to extend the usefulness of the invention, simplify and reduce the costs of construction, and increase the mechanical reliability of the apparatus under severe service conditions.

As with the device of my copending application, brilliant and realistic illuminated effects, in simulation of the movement of natural or fanciful objects over the display screen, are produced by apparatus which condenses light rays from one or more illuminants behind the screen into beams of particular specification, projects those beams in a particular manner through the screen at various areas thereof and at various angles to the field of view, and changes the positions and directions of the beams from instant to instant to create for an observer the illusion of brilliantly lighted areas moving in various directions and at various speeds over the display screen in true representation of the motion depicted.

The novel combination of parts comprising the device of the instant invention may be included in commercial devices of a variety of types to effect valuable contributions to the art. Particularly in the application of the invention to very large displays, the apparatus includes a number of individual animation units of simple construction which are mounted so as to animate selected areas of the display screen.

Because of the light weight, mechanical simplicity and high degree of reliability in operation of these units, animation effects may be provided in display devices of extensive areas, at very low cost and with little or no change from conventional construction of comparable non-animated displays.

More particular objects of the invention will be apparent in the following specification.

The invention is shown in certain preferred embodiments in the accompanying drawings, broadly to illustrate optical principles involved and a practical mode of construction of each device. In the drawings:

Figure 1 is a front elevation of a display board, typical of the application of this invention to outdoor advertising, exhibiting a pictorial design animated by means of animation units locally installed at selected areas behind the display screen.

Figure 2 is a cross section of the same taken as indicated by the section line 2—2 in Figure 1 showing one of the illuminating tubes positioned behind a non-animated area of the screen.

Figure 3 is a sectional elevation of the device taken as indicated by the section line 3—3 in Figure 2 showing the illuminating tubes and the animation units, each positioned with relation to one of the tubes to modulate the light from a portion thereof to animate a selected area of the display screen.

Figure 4 is a cross section of the device taken as indicated by the section line 4—4 in Figure 1 showing one of the illuminating tubes and one animation unit positioned to modulate the light from a portion of the tube.

Figure 5 is a fragmentary perspective view from the rear of one corner of the display screen showing one mode of constructing the same with sheet plastic material.

Figure 6 is a plan view of one of the animation units taken as indicated by the section line 6—6 in Figure 3.

Figure 7 is a side elevation of the same taken as indicated by the section line 7—7 in Figure 6.

Figure 8 is a cross section of the animation unit shown in Figure 6 taken along the curved surface indicated by the section line 8—8 in Figure 6.

Figure 9 is a front elevation of a display device of the portable type employing a single animation unit, with portions of the container and display screen fragmented to expose internal elements.

Figure 10 is a cross section of the same taken as indicated by the section line 10—10 in Figure 9.

Figure 11 is a diagram illustrating, by means of a cross section transverse of the refractors and the illuminant, the construction of the refractors and their relationship one to the other and to the illuminant, to project a plurality of beams substantially parallel to each other through the display screen to the field of view for the purpose described below.

Figure 12 is a diagram of the same type, simplified by showing only that portion of the revolving refractor which is active in producing the effect, and the front refractor, for that construction which will project a plurality of beams convergent to each other to the field of view.

Figure 13 is a diagram similar to that of Figure 12 showing that construction which will project divergent beams.

Figure 14 is a diagram of the optical system formed by one lens of the revolving refractor in optical alignment with the extreme left lens of the stationary refractor and the light source, to illustrate the method of developing the lens contours for the stationary refractor in the construction shown in Figure 11.

Figure 15 is a diagram of the same type, shortened by the elimination of the light source, illustrating the development of lens contours for the stationary refractor of Figure 12.

Figure 16 is a diagram similar to that of Figure 15 illustrating the development of the lens contours for the stationary refractor of Figure 13.

Figures 17, 18, 19 and 20 are diagrams showing the change in direction of the rays projected by lenses of the construction shown in Figure 12 as the rearward refractor turns.

Figures 21, 22, 23 and 24 are diagrams showing the change in direction of the rays projected by lenses of the construction shown in Figure 13 as the rearward refractor turns.

Figure 25 is a cross section of the refractors and the display screen, taken as indicated by the section line 25—25 in Figure 1, showing the construction which provides for steady illumination of the display screen at certain areas thereof behind which animation units are positioned.

Figures 26 and 27 are diagrams illustrating the construction of the refractor lenses to produce a component of motion effect lengthwise of the illuminant and the refractor lenses.

Figure 28 is a cross section of the display screen of the device of Figure 9, taken as indicated by the section line 28—28 in that view.

The invention is shown in two preferred embodiments in the accompanying drawings to illustrate in a broad way the optical principles involved and modes of construction of commercial devices. It is to be understood that the invention may be variously modified and embodied in different types of display devices without departing from the broad spirit and scope thereof. Particularly, various different arrangements of refractors and illuminants and lens conformation may be practiced within the purview of the claims. I therefore desire that only such limitations shall be placed on the invention as are imposed by the prior art or contained in the appended claims.

In Figures 1 to 5 is shown a display board including a front frame, indicated by numeral 1, the back enclosure 2 containing the lights and animation units, and the display screen 3. For the display device proper, thus composed, may be substituted any suitable equivalent construction.

Illumination is provided by a grid of gaseous conduction lighting tubes 4, positioned a short distance from the back wall 5 of the enclosure, plugged into receptacles 6, connected in a series by the cross connections 7, and supplied with high tension current from a conventional source not shown. The interior surfaces of the enclosure should be finished with a light diffusive coating to provide indirect lighting for the screen additional to the direct illumination from the tubes.

The display screen illustrated in Figure 5 is of a type well suited for displays of extensive surface exposed to the elements and the hazards of thrown or blown objects. It is composed of a frame of channel iron 8, having a rounded web 9 and inturned flanges 10, welded at the corners 11 into a rigid structure, a sheet of transparent plastic material 12, and springs 13 which serve to hold the sheet taut in the frame.

The springs 13 are of the double armed cantilever leaf type, each bent from a single piece of flat steel with a tubular formation at the center to receive the anchoring pin 14, and tubular bends at the ends to receive the studs 15. The pins 14 extend through holes in the channel flanges and are welded in place. Stud pins 15 at the ends of the spring arms extend rearward to engage grommets 16 inserted in sheet 12 near the sheet edges. Pressure applied to both ends of each of the springs, simultaneously, away from the frame center, is resisted by spring force at both ends of the spring toward the frame center.

Sheet 12 is applied to the front of the frame with its edge portions wrapped around the channel irons 8, with the stud pins inserted in the grommets. The dimensioning is such that the spring arms must be pressed outward to insert the studs in the grommets, thus placing the springs under pressure and drawing the sheet tight to the channel webs 9, and applying tension to the main surface of the sheet.

The pictorial design shown in Figure 1 on the display screen consists of a flying tire leaving a track on the road. The desired animation is that of revolution of the tire 17 with motion at various speeds and in various directions over various areas thereof according to the angle of view and perspective of the tire, and motion flowing backward along the track at varying speed according to the perspective, the track being indicated by 18. Other portions of the design are to be illuminated without animation. Advertising copy may, of course, be shown in the areas which are blank in the view.

The animation effect is produced by the animation units 19 secured to the back of the enclosure and each surrounding a portion of one of the lighting tubes. Each unit modulates the light of that portion of the tube which it encloses in the manner described below to contribute its share to the total animation effect. The remaining portions of the tubes apply general illumination to the non-animated areas of the screen. As each of the units covers a rectangular area of the display surface it will include in its coverage certain areas of the display, such as those indicated by 20 in Figure 1, which are non-animated. The manner in which this is accomplished will be described below in the description of Figure 25.

As in the device of my copending application cited, each animation unit includes a pair of refractors positioned one behind the other to the rear of the display screen and in front of the light, preferably an elongated light of the gaseous conduction tube type. The refractors are provided with lens formation of particular specification, and are spaced from each other and the light according to the principles explained below. One refractor is moved relative to the other while maintaining uniform spacing between the two to give rise to the animation effect.

In the instant case the rearward one of the refractors is in the form of a tube and is revolved around its axis. The lighting tube passes through the tubular refractor, being located backward of the axis of the tube close to the rear thereof. Only that portion of the moving refractor which is passing between the lighting tube and the forward one of the refractors is active in producing the effects at any particular instant.

As seen in Figures 1 and 3, the animation units 21, 22, 23, 24, 25 and 26 are distributed so as to cover the rear surface of just those portions of the display screen where animation is desired, in rectangular areas. The remainder of the display is free of mechanism. Selected areas of very extensive displays may thus be animated in very economical fashion.

Each of the units includes a body having side walls 27 and 28, and a rear wall 29, shown in Figures 6, 7 and 8. The side walls are formed with slots 30 to receive the front refractor 31. The tubular refractor 32, seen through the fragmented wall 28 in Figure 7, is provided with an outturned flange 33 at the upper end, which flange rides on the idler rollers 34 and 35 and the drive roller 36 fixed to the shaft of the motor 37. The motor is mounted on the outside of the angular portion 39 of the wall 28 with its shaft extending through an opening to the inside. The opposite wall 27 also has a portion 38 bent inward to permit nesting of one unit close to another with the motor of one fitting behind the wall portion 38 of the next, as shown in Figure 3 by broken lines.

The units may thus be positioned close to each other with very little lighting space lost at the meeting edges. The last unit at the right hand end of the display, if it is close to the end wall of the enclosure may be set with its motor extending into a small cover as indicated in Figure 3 at 40. The units are mounted directly on the rear wall of the enclosure and, being light and of considerable rigidity in themselves, call for no special reenforcement of the structure of the display proper.

The refractors 32 run free on the rollers and involve such light mechanical loads that they may be driven by compact and low cost clock motors. Each unit is a complete mechanism in itself and may be located where desired without mechanical connection to other units. Thus animation units may be distributed in any desired fashion to cover selected areas of extensive displays, the only connection between them being the supply wires to the motors. It is obvious, of course, that any other type of drive found desirable may be used.

Preferably top and bottom baffles, 41 and 42, should be provided to prevent diffusion of light from the enclosure proper interfering with the effect. In Figure 6, the top baffle is shown fragmented to expose the bottom baffle and show the opening 43 through which the tube 4, here shown in broken lines, passes. The interior surfaces of the walls 27, 28 and 29, and those of the baffles should be finished a dull black to minimize reflections.

In the diagram of Figure 11 a revolving tubular refractor of forty-eight lenses is shown. The lenses, shown in cross section, are biconvex, of uniform contour and size, elongated and extending the length of the refractor, evenly spaced and parallel to each other. The tubes may be manufactured by the extrusion of any of a number of available clear transparent resins. They may also be cast in a quality suitable for this work.

The illuminant shown is the gaseous conduction lighting tube 4 extending through the revolving refractor, parallel to the lenses thereof, and located as far to the rear as practical. Filament type lights may be used, of either the bulb or tubular type, if desired, but are not as satisfactory as the gaseous lights.

The stationary front refractor 31, which is somewhat wider than the revolving refractor 32, is preferably given a slight curvature around a vertical axis. It is here shown with fifteen lenses. Of the total number of lenses of refractor 32, only those which are in optical alignment with the lenses of the front refractor at any instant are effective in the production of the desired animation effect. As explained below, with refractors constructed as shown in Figure 11, with the revolving refractor in the position therein shown, a like number of the lenses of each of the refractors are effective in producing the bright spot which will be seen at the part of the display here represented by a person located directly forward thereof.

I use the term "optical alignment" to describe any positioning of a lens of the forward refractor, wherein it collects a bundle of rays passing through an image, with the lens of the other refractor producing such image, and projects the rays as a beam to the field of view.

For the sake of clarity in illustration, the refractor 32 is shown in a position in which one of its lenses is centered along the line X—X passing through the axis of the refractor and the center of the lighting tube and perpendicular to the display screen. The refractor 31 is shown with its central lens also centered along this line and the remainder of the lenses symmetrically arranged on each side of center, although this construction is not necessarily followed in practice.

The lenses of refractor 31 are actually, with the exception of the center lens, sections of biconvex lenses. They are elongated, extending in parallel bank formation in the general direction of the lenses of refractor 32. As explained below, and illustrated in Figures 26 and 27, the lenses of one refractor may be at a slant relative to the lenses of the other refractor to produce the component of the desired motion effect in the direction perpendicular to the plane of the drawing.

Considering now the general principle involved in the production of animation effects as seen by an observer in the field of view: As in the device of my Patent No. 2,419,216, the lenses of the rearward refractor collect light from the source, and focus it to produce a bank of elongated images of the source in space between the refractors. The lenses of the front refractor are conformed and spaced so that they focus on these images, collect light rays therefrom, refract the rays, and project them as beams to the field of view.

As the lenses of the rearward refractor are elongated in the direction perpendicular to the plane of the drawing, each lens will produce an elongated image of the light source. The components of the beam lying parallel to the plane of the drawing will be convergent. The components of the beam perpendicular to the plane of the drawing will be freely divergent. As a lens of the forward refractor receives a bundle of rays passing through an image produced by a lens of the rearward refractor it is capable only of refracting the components of the beam lying parallel to the plane of the drawing. The components of the beam perpendicular to the plane of the drawing remain substantially unchanged. The beam projected by each lens of the forward refractor is narrow in one direction and long in the other direction in any cross section through it. I therefore describe these beams as being of "narrow divergence" in one stated direction.

For the sake of clarity in the description, I refer to the beam produced by any one lens of the forward refractor as an "elemental beam." The construction of the refractors is such that these elemental beams are projected in groups, which groups in effect become beams participating in this property of narrow divergence. For clarity in the description, I refer to these groups of elemental beams as "compounded beams."

Movement of one refractor relative to the other transversely of the lenses thereof in its plane (in this case, along a curved surface) results in a change of the directions of the beams to the field of view. An observer positioned in the field of view is reached by these beams from different portions of the display surface at different times.

Those areas of the display screen from which beams are being projected to his position appear to him to be brilliantly lighted, while those portions from which beams are being projected to some other part of the field of view appear to him to be dark. The construction and operation of the device is such that he will see a procession of bright and dark areas moving over the display surfaces at each place where motion is to be represented, in the direction of the motion to be depicted and at a speed corresponding thereto, and in different directions and at different speeds from place to place over the display surface as the design requires.

At any given instant, from another point of view in the field of view, another observer will see essentially the same effect but in a different phase as he will be covered by the beams in the same sequence but in a different phase. Thus the effects are secured, not by blocking light with resultant loss of luminous efficiency, but by projecting beams of high intensity to the field of view to produce effects of light and dark areas which seem to change in position on the display surface. The non-animated areas of the display screen appear in steady illumination.

As the desired animation effects are produced by the direct observation of the light of the projected beams, the display screen 3 must be transparent to these beams to such a degree that any light diffused at the screen will be of such low intensity as not to detract from the desired animation effect.

Considering the appearance of the portion of the screen represented in Figure 11 to a person in the field of view directly forward of the axis X—X: As a group of elemental beams is covering his position he will see a bright region over the entire area of the screen through which the beams pass. When the rearward refractor 32 revolves to send these beams in a different direction, this area will appear dark to him except for rays which reach him as the result of any diffusion which may take place at the screen. It follows that, to produce the best effects, a high degree of transparency of the screen is required.

The manner in which the beam movement is accomplished will now be considered. In Figure 14 the luminous tube 4, the extreme left lens of the front refractor shown in Figure 11, and one lens of the revolving refractor are shown in optical alignment, projecting a beam perpendicular to the display screen to the field of view.

In the description of the diagram which follows, the indicated "points" and "centers" correspond to lines in the three dimensional optical system of the apparatus. Likewise "rays" and "lines" correspond to planes.

The chief ray of the bundle of rays collected by the lens "B" from the center of the glowing gas column of the tube 4, indicated by "A," is shown in a dot and dash line. Passing through the optical center of lens "B" it passes through the focal point "C," hereafter simply described as "focus," and finally reaches the lens "D" of the front refractor. The bundle of rays collected by "B" for the given position of the revolving refractor is indicated by "a."

The bundle of rays projected by "B" convergent to the focus is indicated by "b." If all of these rays are collected by the lens "D" and effectively directed to the field of view we may then accept that all of the rays in the arc indicated by Y—Y in Figure 11 are effective in the final display effect. We also note that making use of the extreme rays in this arc permits of developing the front refractor so that it is of greater width than the revolving refractor. Thus the animation units may be positioned edge to edge with the minimum of unlighted space between them and sufficient mechanical clearance may be provided for the revolving refractor.

From every point within the luminous column of the tube 4 another bundle of rays will be collected by the lens "B" and projected to a focus, thus building an image in space around the point "C." This image will be a solid image of the gas column and obviously highly distorted due to the aberrations of the lens. What we are concerned with in this work is not the fidelity of this image to the source, but the direction that the rays take through this region, which is comprehended in the term "focal region." The term "image" is thus used in the claims in the sense of embracing the focal region or luminous region where a true image would exist but for the various aberrations of the lens, and the inaccuracies of the device.

The front refractor is divided into fifteen sections, each section being an elongated lens, or more accurately, an elongation of a partial lens. The exact number of lenses is not material in the description which follows as it will hold in principle if the number be somewhat greater or somewhat less than the number of images involved. The effect is determined by the relative spacing of the images of the source and the lenses of refractor 31 transversely of the axis X—X.

It is desired now to develop that contour of lens "D" in Figure 14 which will result in the rays collected by it through the focal region around point "C" being projected directly forward to the field of view, that is, perpendicularly through the display screen.

Draw the line "C"—"g" perpendicular to the display screen. Along this line locate the optical center "E" of a lens which would lie along the surface indicated by Z—Z, the elected general shape of the front refractor, of sufficient width to reach to the extreme left of the refractor, and of focal length, considering the index of refraction of the material, to focus on the point "C" and project the rays parallel and forward.

It will be found in developing a complete refractor that, in order to achieve a satisfactory structural form, it is preferable to take the axis of this lens parallel to the chief ray from "A" as shown. Draw the line "h"—"k" through this optical center "E" in the direction elected for the axis of the lens and along this line locate the centers of curvature of the lens as indicated by "F" and "G." By predetermination, to achieve the effect desired, a certain dimension transversely of the axis X—X has been decided on for each of the lenses. That portion of the lens which has now been outlined which comes within the space predetermined for the first lens on the left of the refractor is shown in solid lines with the side surface "m" sloped in the direction of the point "C," with the remainder shown in broken lines.

The partial lens so determined may be rotated around its optical center for a fair range of positions without materially changing the beam projection. In deciding the best contour of the finished refractor, any of the positions in this range may be selected according as it yields the most satisfactory final form of the refractor from a structural standpoint.

As the refractor 32 revolves the images pass along a curved surface indicated by W—W, which is the focal plane of the lenses of the refractor 31.

In Figure 11, the front refractor 31 is shown, developed in such fashion, according to the principles above set forth, that all of the lenses may be molded or cast in a unitary structure. For the position of refractor 32 shown in this view, the optical center of each of the lenses of refractor 31 is located directly forward of a focal point of a corresponding lens of refractor 32. The angle of line "h"—"k," with respect to axis X—X, through the optical center of each of the lenses of refractor 31, is so chosen that the lenses developed from centers of curvature along this line will intersect each adjacent lens so as to present a minimum of lens cross section required by the fabricating method used.

It is apparent that each of the lines "C"—"g" may now be treated as the chief ray of the elemental beam of one of the lenses thus finally determined, even though it does not intersect the lens. Hence in the analysis below of the manner in which the beams produce the final observed effect, each elemental beam is represented by one of the chief rays from the focal points.

Thus in Figure 11, the optical centers of the lenses of the front refractor having been located directly forward of the focal points of the lenses of the revolving refractor for the position of the revolving refractor shown, the chief rays of the projected beams are, by determination, parallel to each other and perpendicular to the display screen, and the projected beams will be parallel to each other and perpendicular to the screen.

Now, if we desired that the beams be convergent toward each other, the spacing of the optical centers of the lenses of the front refractor is decreased as compared with the spacing of the images of the source transversely of the line X—X. Thus in Figure 12, the chief rays of the projected beams are convergent to some point along the forward extension of the line X—X. In Figure 15 the development of the extreme left lens of the front refractor to produce this condition is illustrated.

The procedure here differs from that shown in Figure 14 only in that the chief ray of the projected beam along "C₁"—"g₁" is drawn in the new direction, for this lens sloping to the right.

To develop a front refractor which will project the beams divergently as shown in Figure 13, we need merely proceed by increasing the spacing of the optical centers of the lenses of the front refractor as compared with the spacing of the images of the source transversely of the line X—X. In Figure 16 the development is shown in which the chief ray of the projected beam along "C₂"—"g₂" for the extreme left lens slopes to the left.

The width of the elongated images of the source will depend on the width of the source. Best results are had by using gaseous discharge tubes of small diameter and high intensity to keep the degree of divergence of the projected beams within limits. As a matter of fact, a certain degree of divergence is desirable as we note below.

The manner in which the effect of motion in one direction transverse of the lenses is produced by the revolution of the rear refractor is shown in Figures 17, 18, 19 and 20, and in the opposite direction by Figures 21, 22, 23, and 24. In each of these views the optical centers of the lenses of the refractor 32 are indicated by small circles distributed along a circular line, the radius of which is approximately that of the tubular refractor. Along the line W—W is drawn a series of small circles indicating the position of the images of the source. This line represents the curved surface which will pass through the centers of the elongated images of the source. As the refractor revolves, the images will move along this surface. To each of the images is drawn the chief ray of the bundle of rays projected to it from the source at "A." These image points are the foci of the projected beams.

The optical centers of the lenses of the front refractor are indicated by small circles along the line Z—Z. In Figures 17 and 18 a line is drawn from each focus through the optical center of one lens forward of the same, in representation of one of the elemental projected beams. In Figure 19, in which the refractors are illustrated in relative positioning such that two lenses of the forward refractor are capable of collecting rays passing through a single focal region, two such lines are drawn from each of the majority of the focal points through the two lenses in position to effectively collect rays and project them as elemental beams. The two groups of elemental beams thus illustrated represent two compounded beams projected in different directions. In Figure 20, the refractors are shown shifted in relative positioning such that a single compounded beam is produced. Similar representation of projected beams is used in Figures 21 to 24.

It is to be understood that these diagrams are idealized to show a desirable condition of projected beams which may not be fully attained in practice. Due to the fact that the foci and the lenses of the front refractor are distributed along curved surfaces, which curved surfaces are of different radii, it is necessary to make a compromise between the various design factors to come as close to the conditions represented by the diagrams as practical commercial requirements dictate. For instance: By reducing the width of the lenses, and hence the distance which each lens moves to effect the full cycle of beam changes, the deviation from the desired beam condition is reduced. But the manufacturing costs will increase when the lenses are designed too narrow.

Considering now Figure 17, it will be seen that an observer directly in front of the device will be reached by the beam projected directly forward by the central lens of the front refractor. He will consequently see a bright area on the display screen behind which this lens is situated. However, since the beams have a certain minimum divergence in any case, he will be reached by some beams of the adjacent lenses and the bright area which he observes will be wider than if he were covered only by the beam of the one lens. Sharpness in the imagery of the effect is served by narrow beams. Smoothness in the effect is served by wider beams. Economy of manufacturing cost is served by designing the lenses to produce a beam divergence no narrower than necessary to produce distinct effects.

There being 48 lenses around the revolving refractor, a displacement of 7.5 degrees represents a full cycle of beam changes. In the series of views from Figure 17 to Figure 20, the circles representing the optical centers of the revolving refractor are displaced 1.875 degrees in successive views to illustrate beam conditions in four stages of a complete cycle of changes as the refractor revolves counter-clockwise in the diagrams. The same changes are made in the views of Figures 21 to 24.

By specification, the beams of Figure 17 are convergent to some point on the forward extension of the line X—X. In effect, a real compounded image of the light source will be produced around this point. In the discussion which follows, and in the use of the term "compounded image" in the claims, it is to be understood that this term is used to embrace in a broad sense the luminous region through which the rays pass which would produce a true image of the source but for the aberrations of the lenses, the deviation from theoretically correct optical conditions, and inaccuracies of construction. Actually this compounded image is highly aberrated.

It will be seen from Figures 18, 19 and 20 that, as the revolving refractor turns counter-clockwise and displaces the foci, the beams take new directions such that an observer is covered by beams from lenses farther and farther to the left, and finally by new beams advancing from lenses at the right toward the left. In effect he is observing a succession of real compounded images of the source in space between himself and the display screen moving from right to left.

In Figure 21, by specification, the beams projected to the field of view are divergent from a point on the rearward extension of the line X—X, that is, from a virtual compounded image of the light source. As the revolving refractor turns counter-clockwise the observer is covered by beams from lenses in the opposite order, that is, from left to right. He will in effect be observing a succession of virtual compounded images of the source in space behind the display screen moving from left to right.

In either case, since the images are seen only by virtue of beams projected through the display screen directly to his position, the images will appear to be on the surface of the display screen.

The spacing of the compounded images depends on the ratio of the spacing of the lenses of the front refractor (as represented by the optical centers as described) and the spacing of the images of the source. For the arrangement shown in Figure 12, by decreasing the spacing of the lenses of refractor 31 the beams converge to a greater extent, and the real compounded images are spaced more closely and move more slowly. For the arrangement shown in Figure 13, by decreasing the spacing of the lenses of refractor 31, the beams diverge to a lesser extent, the virtual compounded images are more distantly spaced and move more rapidly. Thus motion in either direction transversely of the lenses and at any desired speed may be produced in the effect. For the construction illustrated by Figure 11, where the ratio is 1, the observer will see flashes of light over the entire area of the front interceptor, which flashes come and go with practically no directional component.

To produce the effect of motion in the general direction lengthwise of the lenses, the lenses of one refractor are constructed to lie at an angle to the lenses of the other refractor. Since it is most practical to have all variations in the lenses of the front refractor, the lenses of the rear refractor are made parallel to each other and to the refractor axis as standard construction. In constructing a display to produce any particular animation effect, the refractor 31 is constructed with appropriate spacing of the lenses and slope of the lenses relative to those of refractor 32 to produce the desired motion effect over the display surface.

In Figure 26, the front refractor is shown with its lenses outlined in solid lines. The rear refractor is indicated with its lenses outlined in broken lines. Assuming the spacing of the images of the source produced by the lenses of the rear refractor to be the same as the spacing of the optical centers of the lenses of the front refractor transversely thereof, and that the rear refractor turns so that its lenses are shifted from left to right in the diagram, the effect produced will then be that of motion directly upward, since the lenses of the front refractor slope to the right upwardly.

Under the same conditions, the effect produced by the lens arrangement illustrated in Figure 27 will be that of motion directly downward, since the lenses of the front refractor slope to the right and downward.

The speed in the effect produced will vary with the relative slope of the lenses of the two refractors. Decreasing the angle between the lenses of the two refractors increases the speed of the apparent motion in the direction of the lenses, while increasing the angle decreases the speed.

By combining the two variations in different degrees at different places over the area of the display screen, motion in any direction and at any speed may be represented.

As the animation units cover rectangular areas of the display screen, there will be certain areas such as those indicated by numeral 20 in Figure 1 which are to be illuminated by unmodulated rays. The animation effect may be prevented from appearing at such places by several devices.

The lenses, of course, may be eliminated at such places, but this is not necessarily the most desirable arrangement as the lenses function to concentrate the rays in the general forward direction and to that extent improve the illumination of the non-animated areas. One satisfactory device is to provide a diffusive screen between the front refractor and the display screen as indicated by 50 in Figure 25, one side of this screen being shown roughened to indicate its diffusive property.

To prevent light from the animated and non-animated areas interfering with the effect, baffles such as that indicated by 51 may optionally be placed perpendicular to the display screen.

As in conventional practice in the production of lighted transparent signs, the non-animated areas may be finished to be highly diffusive of light in order to even the illumination and conceal the position of the illuminants. Over the animated areas of the display screen however, we have a different condition. The motion effect is in reality a direct exhibition of the light source in the form of the peculiar images above described. Diffusion at the surface of the display screen is therefore preferably limited.

At the option of the designer, the picture, painted in diffusive pigments may extend over the animated areas by restricting the density of the finish at these areas so as not to detract from the animation effect to an objectional degree.

In some instances the diffusive character of the design painted on the display screen may be sufficient to prevent the animation effect being observed at the areas indicated by 20.

While in the embodiment of the invention above described, I have disclosed a device in which the front refractor and the display screen are separate elements, the function of both may be combined in a single element. In the embodiment of the invention shown in Figures 9, 10 and 28, I show a display screen which is molded, pressed or cast with lens portions where animation is to appear and with smooth portions over the remainder of the display surface.

In this device the animation is provided by a single revolving refractor in the horizontal position. The enclosure includes the top sheet member 53, back 54, bottom 55, and front 56. The front has a cut-out opening against which the display screen 52 is held by clips 57. This screen is curved in the shape to function as the front refractor and is provided with integral lenses 58 at just those areas where animation is to be produced. In this instance the animation is to appear along the outlines of the letters 59 and the streamers from the star, 60. The remaining area remains flat and is treated to be highly diffusive to break up all beams falling upon it and provide essentially steady illumination for any desired background finish. Alternatively the background may be opaque to provide maximum contrast for the animation.

The revolving refractor 61, in the form of an open ended tube, is carried by four rollers from which it hangs. The rollers 62 and 63, at the front right and front left, carried by the brackets 64 and 65, are idlers. A third roller at the left rear, not shown, and carried on the bracket 66 is also an idler. The fourth roller 67 carried on the shaft of the motor 68 at the right rear is the driver. The motor is mounted directly on the back of the container.

The tubular light 69, carried in the receptacles 70 and 71, mounted directly on the back of the container, provides the illumination. The end covers 72 and 73 complete the enclosure.

This device is intended for use in locations where it is seen at a level somewhat lower than the observer's eye, that is, in such places as on a window seat or store counter. The illuminant is therefore located at a level somewhat below that of the revolving refractor axis, and the line X—X through illuminant, revolving refractor axis and center of the front refractor, slopes upward to the left. The lenses are developed with reference to this line in the same fashion as described above.

While I have described the illuminants used in the devices as shown in the drawings as being elongated lights, it is to be understood that, for the purposes of this invention, illuminants having concentrated light sources, such as incandescent bulbs may also be used as the elongated lenses of the revolving refractors will produce elongated images from either type.

In describing my lenses as being in fact sections of complete positive lenses which may be developed from centers of curvature lying along lines passing through "optical centers" as above defined, I am aware that the optical equivalent of my lenses may be substituted, and comprehend all such equivalents in the terms of my claims. For instance: A complete positive lens with a prism, or a complete positive lens containing prism may be substituted for my lens with the same results as the optical equivalent.

In the claims, the term "light source" embraces any object or any surface of any object rendered luminous and functioning as the light source as specified.

Having thus described my invention, what I claim is:

1. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis, whereby the elemental beams thus projected converge in effect to real compounded images of said source or diverge in effect from virtual compounded images of said source, said compounded images moving in representation of the desired motion effect at different rates transverse of the tube axis from place to place over the display surface.

2. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis, the spacing of the optical centers of the lenses of the stationary refractor transverse of said tube axis being varied as compared to the spacing of the images produced by the corresponding lenses of the revolving refractor from region to region over the display surface in accordance with the desired component of the motion effect to be produced transverse of the tube axis, whereby the elemental beams thus projected converge in effect to real compounded images of said source or diverge in effect from virtual compounded images of said source, said compounded images moving in representation of the desired motion effect at different rates from place to place over the display surface.

3. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis, the spacing of the optical centers of the lenses of said stationary refractor transverse of said tube axis being less than the spacing of the images produced by the corresponding lenses of the revolving refractor at certain regions of the display surface, whereby the elemental beams thus projected converge in effect to real compounded images of said source, and the spacing of the optical centers of the lenses of said stationary refractor transverse of said tube axis being greater than the spacing of the images produced by the corresponding lenses of the revolving refractor at certain other regions of the display surface, whereby the elemental beams thus projected diverge in effect from virtual compounded images of said source, said real compounded images moving in one direction transverse of said tube axis and said virtual compounded images moving in the opposite direction in representation of the desired motion effect over the display surface.

4. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis. The spacing of the optical centers of the lenses of said stationary refractor transverse of said tube axis gradually changing with respect to the spacing of the images produced by the corresponding lenses of the revolving refractor in such order that the projected elemental beams converge to real compounded images of said source or diverge from virtual compounded images of said source to different degrees from point to point transverse of said tube axis, whereby the compounded images so produced move at gradually changing speed in representation of the desired motion effect over the display surface.

5. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis, whereby the elemental beams thus projected converge in effect to real compounded images of said source or diverge in effect from virtual compounded images of said source, the lenses of said stationary refractor being slanted relative to the lenses of said tubular refractor in at least one region of the display surface in accordance with the desired component of the motion effect to be produced in the direction of said tube axis over the display surface at said region.

6. A device for simulating motion in a design represented on a display surface by the various movements of light areas thereover, including: a tubular refractor having a plurality of elongated lenses extending in bank formation in the general direction of the tube axis, means to revolve said refractor around the tube axis, a light source positioned to illuminate the interior of said refractor, said lenses being conformed to project a plurality of elongated images of said source in bank formation along a curved surface and to move said images in a series along said surface as the refractor is revolved, a stationary refractor positioned in front of said tubular refractor having a plurality of elongated lenses in bank formation extending in the same general direction as the tube axis and conformed to focus on said images and project therefrom to the field of view elemental beams of light which are of narrow divergence in that dimension of their cross section transverse of the tube axis, whereby the elemental beams thus projected converge in effect to real compounded images of said source or diverge in effect from virtual compounded images of said source, the lenses of the stationary refractor being slanted relative to the corresponding lenses of the revolving refractor to different degrees from region to region over the display surface in accordance with the desired component of the motion effect to be produced in the direction of said tube axis over the display surface.

7. A device as specified in claim 1 in which the light source consists of an elongated illuminant extending through the tubular refractor.

8. A device as specified in claim 2 in which the light source consists of an elongated illuminant extending through the tubular refractor.

9. A device as specified in claim 3 in which the light source consists of an elongated illuminant extending through the tubular refractor.

10. A device as specified in claim 4 in which the light source consists of an elongated illuminant extending through the tubular refractor.

11. A device as specified in claim 5 in which the light source consists of an elongated illuminant extending through the tubular refractor.

12. A device as specified in claim 6 in which the light source consists of an elongated illuminant extending through the tubular refractor.

FRED HOTCHNER.

REFERENCES CITED

The following references are of record in the file of this patent:

UNITED STATES PATENTS

| Number | Name | Date |
| --- | --- | --- |
| 2,272,945 | Hotchner | Feb. 10, 1942 |
| 2,419,216 | Hotchner | Apr. 22, 1947 |